United States Patent Office 3,017,421
Patented Jan. 16, 1962

3,017,421
FLUORINE-CONTAINING COMPOUNDS AND PROCESS FOR PREPARING THEM
Werner V. Cohen, Glen Farms, Md., assignor to E. I. du Pont de Nemours and Company, Wilmington, Del., a corporation of Delaware
No Drawing. Filed Apr. 27, 1959, Ser. No. 808,900
13 Claims. (Cl. 260—456)

This invention relates to new fluorine-containing compounds and to a novel process for preparing them, and particularly to polyfluoroalkyl chlorosulfonates and bis-(polyfluoroalkyl) sulfates and their preparation from polyfluoroalkanols.

Polyfluoroalkyl sulfuric acids, their salts and some related compounds are known to the art and are valuable compounds for a variety of purposes. Other related compounds having improved properties and a wider range of usefulness are desired.

It is an object of this invention to provide new polyfluoroalkyl chlorosulfonates and bis(polyfluoroalkyl) sulfates which have valuable properties and a wide range of utility. Another object is to provide a novel process for preparing such chlorosulfonates and sulfates, particularly from the corresponding polyfluoroalkanols. A particular object is to provide a process which can be readily controlled to produce either said chlorosulfonates or said sulfates as the predominant product or mixtures of said compounds. Other objects are to provide new compositions of matter and to advance the art. Still other objects will appear hereinafter.

The above and other objects may be accomplished in accord with this invention which comprises reacting from about 0.5 to about 1.25 mol of sulfuryl chloride with about 1 mol of an alkali metal alkoxide of the formula $$Y(CF_2)_nCH_2OM$$

wherein M is an alkali metal of an atomic weight of less than 40, Y is a member of the group consisting of hydrogen and fluorine and n is an integer of from 1 to 12, in an inert organic solvent at a temperature of from about 25° C. to about 120° C. whereby there is obtained novel polyfluoroalkyl compounds of the formula $$Y(CF_2)_nCH_2O\text{—}SO_2\text{—}X$$

wherein X is a member of the group consisting of chlorine and a —O—CH$_2$(CF$_2$)$_m$Y group, each Y is a member of the group consisting of hydrogen and fluorine, and each of n and m is an integer of from 1 to 12.

Where X in the above formula is chlorine, the compounds will be polyfluoroalkyl chlorosulfonates of the formula $$Y(CF_2)_nCH_2O\text{—}SO_2\text{—}Cl$$

wherein Y is a member of the group consisting of hydrogen and fluorine and n is an integer of from 1 to 12. Preferably, the chlorosulfonates will be those in which Y represents hydrogen and particularly wherein n is an integer of from 1 to 6.

When X represents a —O—CH$_2$(CF$_2$)$_m$Y group, the compounds will be the bis(polyfluoroalkyl) sulfates of the formula $$Y(CF_2)_nCH_2O\text{—}SO_2\text{—}OCH_2(CF_2)_mY$$

wherein each Y is a member of the group consisting of hydrogen and fluorine and each of n and m is an integer of from 1 to 12. In this case also, each Y preferably will represent hydrogen and each of n and m will be an integer of from 1 to 6.

The compounds of this invention are insoluble in water and in hydrocarbon oils, are resistant to hydrolysis and to the action of alkaline media, and are quite stable to fairly high temperatures. Those, in which each of n and m is an integer of from 1 to 6, are colorless liquids which are useful as solvents, e.g. for polyvinyl fluoride which is a material that is known to be difficultly soluble in common solvents. The compounds of higher molecular weight normally are waxy solids and may be used as waxes to coat solids, such as wood, metal, stone, etc., and render such solids repellent to water and to oils. The solid products are also useful as solid lubricants.

The polyfluoroalkyl chlorosulfonates and the bis(polyfluoroalkyl) sulfates of this invention are also useful as intermediates for the preparation of other valuable compounds and particularly as fluoroalkylating agents. For example, the compounds of this invention can be used to fluoroalkylate primary and secondary amines, whereby the polyfluoroalkyl group of the chlorosulfonate or of the sulfate will replace a hydrogen atom which is attached to the nitrogen of the amine. When the amine is a primary aromatic amine such as aniline, the polyfluoroalkylated amine can be used for the preparation of a dye by coupling it with a diazotized compound by conventional procedures.

The compounds of this invention also undergo a fluoroalkylating reaction with lithium halides, particularly with lithium halides of the formula LiX wherein X represents a halogen having an atomic weight below 80, i.e. fluorine, chlorine, and bromine. In this fluoro alkylating reaction, a polyfluoroalkyl group replaces the lithium and the residue forms a lithium salt. This reaction, employing a bis-(polyfluoroalkyl) sulfate of this invention, may be represented by the following equation:

(1) $[Y(CF_2)_nCH_2O]_2SO_2 + 2LiX$
$\rightarrow Y(CF_2)_nCH_2X + Y(CF_2)_nCH_2O\text{—}SO_2\text{—}OLi$ For example, from 1H,1H,3H-tetrafluoropropyl chlorosulfonate and bis(1H,1H,3H-tetrafluoropropyl) sulfate and LiBr, LiCl and LiF, there is obtained 3-bromo-1,1,2,2-tetrafluoropropane, 3-chloro-1,1,2,2-tetrafluoropropane and 3-fluoro-1,1,2,2-tetrafluoropropane, respectively. In general, the compounds of the formula Y(CF$_2$)$_n$CH$_2$X are valuable solvents. For example, Hasek and Haven, in their copending application Serial No. 743,012, filed June 19, 1958, U.S. Patent No. 2,980,740, disclose that 3-fluoro-1,1,2,2-tetrafluoropropane is a useful solvent medium for the polymerization of perfluoroolefins, such as tetrafluoroethylene. It will be noted that the compounds of the formula Y(CF$_2$)$_n$CH$_2$X correspond to the starting polyfluoroalkanol with the hydroxyl group replaced by halogen. Thus, the process and products of this invention are useful in the replacement of the hydroxyl groups of polyfluoroalkanols by selected halogen atoms without introducing additional halogen atoms into other parts of the molecule.

Further, the reaction of the bis(polyfluoroalkyl) sulfates of this invention with the lithium halides, as shown in Equation 1, yields lithium salts of the formula $$Y(CF_2)_nCH_2O\text{—}SO_2OLi$$

which are disclosed by Berry and Bittles in Patent 2,559,751 to be useful as dispersing agents, fluoroalkylating agents, and flameproofing agents. Thus the process and compounds of this invention are useful in the preparation of such valuable compounds of Berry and Bittles.

The fluoroalkylating reactions of the compounds of this invention with the lithium halides are readily carried out by heating the reactants in an inert solvent at a temperature of from about 125° C. to about 170° C. Suitable solvents for this reaction are diethylene glycol and other ethers of glycol and polyglycols which ethers have the structure RO(CH$_2$CH$_2$O)$_n$R' wherein n is an integer of from 1 to 4 and R and R' represent alkyl radicals of 1 to 4 carbon atoms or a cyclohexyl radical. The fluoroalkylation reactions with amines can be carried out at temperatures of the order of 230° C. These reactions of the compounds of the present invention are surprising because the corresponding use of non-halogenated aliphatic sulfates having a chain length of 3 or more carbon atoms is virtually impossible due to competitive side reactions which lead to olefin formation and decomposition. For example, it is known (Nef, Ann. 318, 45, (1901)) that dipropylsulfate decomposes into propylene, $CO_2$, $SO_2$, etc. on heating at temperatures up to 140° C.–170° C. The compounds of the present invention are quite stable at such temperatures and at considerably higher temperatures, whereby such competitive reactions and decomposition cannot take place.

The process of this invention is simple and readily carried out and controlled to produce, as the predominant or substantially sole product, either the chlorosulfonates or the sulfates of this invention or mixtures of both the chlorosulfonates and the sulfates, the results obtained depending in part on the proportion of the sulfuryl chloride employed and in part, on the time of the reaction. It comprises reacting from about 0.5 to about 1.25 mols of sulfuryl chloride with about 1 mol of an alkali metal alkoxide of the formula $$Y(CF_2)_nCH_2OM$$

wherein M is an alkali metal of an atomic weight of less than 40, i.e. Li, Na and K, Y is a member of the group consisting of hydrogen and fluorine and $n$ is an integer of from 1 to 12, in an inert organic solvent at a temperature of from about 25° C. to about 120° C., preferably, from about 40° C. to about 100° C. The reactions taking place may be represented by the following equations:

(2) $Y(CF_2)_nCH_2OM + SO_2Cl_2 \rightarrow$
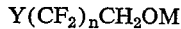
$Y(CF_2)_nCH_2OSO_2Cl + MCl$ and (3) $2Y(CF)_nCH_2OM + SO_2Cl_2 \rightarrow$
$(Y(CF_2)_nCH_2O)_2SO_2 + 2MCl$ Thus where 1 mol of sulfuryl chloride is used for each mol of the alkoxide, the polyfluoro alkyl chlorosulfonate is obtained as the sole or predominant product. By reducing the proportion of sulfuryl chloride to 0.5 mol and allowing the reaction to go to completion, the bis(polyfluoroalkyl) sulfate will be produced as the sole or predominant product. A mixture of the polyfluoroalkyl chlorosulfonate and of the bis(polyfluoroalkyl) sulfate may be obtained by employing between 0.5 and 1 mol of the sulfuryl chloride and/or by terminating the reaction before it is complete. A moderate excess of sulfuryl chloride is usually desirable to ensure maximum yield of the desired product. For maximum yields of the polyfluoroalkyl chlorosulfonate, it is usually desirable to employ about 1.25 mol of sulfuryl chloride. Large excesses of sulfuryl chloride have no advantage, but result in waste of valuable reactant and present the problem of recovering the excess. The formation of the polyfluoroalkyl chlorosulfonate is fast, and the formation of the bis(fluoroalkyl) sulfate is slow. The chlorosulfonates and sulfates in such mixtures can be separated from each other by conventional techniques, such as distillation.

The polyfluoroalkanols, useful in the preparation of the alkali metal alkoxide starting material, are the 1H,1H-polyfluoro-1-alkanols and the 1H,1H,ωH-polyfluoro-1-alkanols. The 1H,1H,ωH-alkanols are described by Joyce, Jr. in U.S. Patent 2,559,628, and are prepared by telomerizing tetrafluoroethylene with methanol. The other class of polyfluoroalkanols, $C_nF_{2n+1}CH_2OH$, are prepared as described by Husted and Ahlbrecht in U.S. Patent 2,666,797. The polyfluoroalkanol is treated with the free alkali metal or alternatively with a hydride or hydroxide of the metal. The operable metals are sodium, potassium, and lithium, with sodium being the preferred species. When the free metal is used, it is reacted with an excess of the polyfluoroalkanol, the excess functioning as an inert solvent. When the metal hydride is used, it is desirable to have present a solvent inert to the other materials in the reaction. Such solvents may include ether, dioxane, and the dimethyl and diethyl ethers of glycol and polyglycols. With the use of hydroxides, benzene and toluene are preferred solvents, since the water formed can be removed by azeotropic distillation.

Suitable solvents or reaction media for the process of this invention include excess polyfluoroalkanol starting material (when it is a liquid), dioxane, and ethers of glycols and polyglycols which ethers have the structure $RO(CH_2CH_2O)_nR'$ wherein $n$ is an integer of from 1 to 4 and R and R' are alkyl radicals of 1 to 4 carbon atoms or a cyclohexyl radical.

The sulfuryl chloride may be added either pure or in a solution to a solution of the alkoxide component. The reaction mixture is heated to from about 25° C. to about 120° C., preferably at from about 40° C. to about 100° C., and generally for ¼ to 48 hours. The metal chloride (MCl) forming in the reaction is generally insoluble and may be removed by filtration. The desired products, when in the liquid state, may then be purified by distillation. The higher molecular weight products, which are normally solids, may either be distilled under reduced pressure or purified by washing or recrystallization.

In order to more clearly illustrate this invention, preferred modes of carrying it into effect, the advantageous results to be obtained thereby and modes of utilizing the compounds of the invention, the following examples are given in which the parts or proportions are by weight except where specifically indicated otherwise.

EXAMPLE 1

*1H,1H,3H-tetrafluoropropyl chlorosulfonate*

Sulfuryl chloride (168.5 g., 1.25 mol), dissolved in 1H,1H,3H-tetrafluoro-1-propanol (132 g., 1 mol), was added dropwise at 45° C.–65° C. to a solution prepared by reacting sodium wire (23 g., 1 mol) with 1H,1H,3H-tetrafluoro-1-propanol (330 g., 2.5 mol). At the end of one-half hour's stirring, the solution was acidic. The reaction mixture was filtered to remove sodium chloride, and the filtrate was distilled. The fraction distilling at 142° C. to 145° C. (127.5 g.) was the desired 1H,1H,3H-tetrafluoropropyl chlorosulfonate and had an index of refraction ($n_D^{20}$) of 1.3710.

*Analysis.*—Calculated for $C_3H_3O_3SF_4Cl$: C, 15.61; S, 13.87, Cl, 15.39. Found: C, 15.55; S, 13.5; Cl, 15.25.

EXAMPLE 2

*Bis(1H,1H,3H-tetrafluoropropyl) sulfate*

Sodium wire (23 g., 1 mol) was reacted at 80° C.–95° C. in excess 1H,1H,3H-tetrafluoro-1-propanol (330 g., 2.5 mol). To this solution, sulfuryl chloride (67.5 g., 0.5 mol), dissolved in 1H,1H,3H-tetrafluoro-1-propanol (132 g., 1 mol), was added slowly at 70° C.–85° C. A white precipitate of sodium chloride formed. After standing for about 48 hours at room temperature, the strongly acidic mixture was filtered to remove the salt. The filtrate was distilled at 107° C.–112° C. to remove unreacted fluoroalkanol. The residue from the first distillation consisted of two immiscible phases which were then fractionally distilled under vacuum. The desired bis(1H,1H,-3H-tetrafluoropropyl) sulfate distills at 90° C. to 91° C./6 mm. (61.5 g.); $n_D^{20}$ 1.3498.

*Analysis.*—Calculated for $C_6H_6O_4SF_8$: C, 22.1; H, 1.84; F, 46.62; S, 9.81. Found: C, 22.7; H, 2.1; F, 45.1; S, 9.9.

EXAMPLE 3

*1H,1H,5H-octafluoropentyl chlorosulfonate and bis(1H, 1H,5H-octafluoropentyl) sulfate*

Sodium wire (23 g., 1 mol) was dissolved in 1H,1H,5H-octafluoro-1-pentanol (571 g., 2.46 mol) at 90° C.–95° C. To this solution, sulfuryl chloride (67.5 g., 0.5 mol)

was added dropwise at 40° C. To avoid loss of sulfuryl chloride, a reflux condenser cooled with ice water was used. The pot temperature was raised to 100° C. and kept at that temperature for one hour. The mixture was then cooled and sodium chloride was removed by filtration. The filtrate consisted of two immiscible layers which were separated. The top layer was excess 1H,1H,5H-octafluoro-1-pentanol, B.P. 140° C.–145° C. The lower layer yielded two fractions. One fraction collected at 67° C.–74° C./6 mm. (51 g.), $n_D^{20}$ 1.3559, was 1H,1H,-5H-octafluoropentyl chlorosulfonate.

*Analysis.*—Calculated for $C_5H_3O_3SF_8Cl$: C, 18.15; H, 0.91; S, 9.68; F, 46.0. Found: C, 18.5; H, 1.1; S, 9.3; F, 45.2.

The other fraction of the lower layer was collected at 127° C./6–7 mm. (33 g.), $n_D^{20}$ 1.3379, and was bis(1H, 1H,5H-octafluoropentyl) sulfate.

*Analysis.*—Calculated for $C_{10}H_6O_4SF_{16}$: C, 22.8; H, 1.14; S, 6.08; F, 57.79. Found: C, 22.5; H, 1.2; S, 5.8; F, 56.2.

EXAMPLE 4

*Bis(1H,1H,11H-eicosafluoroundecyl) sulfate*

Sodium hydride powder (12 g., 0.5 mol) was added to a mixture of 1H,1H,11H-eicosafluoro-1-undecanol (266 g., 0.5 mol) and ether (178 g.). The charge was refluxed for 6 hours. After the first half hour of refluxing, the mixture thickened considerably. Sufficient xylene was added to precipitate the sodium alkoxide (i.e. the sodium salt of the alcohol) formed. The sodium alkoxide was collected by filtration and then suspended in dioxane (200 ml.). Sulfuryl chloride (41.7 g., 0.31 mol) was added dropwise to the suspension. There was a slight rise in temperature. The mixture was refluxed at 90° C. for twenty hours. After cooling, the reaction mixture was extracted with three 200 ml. portions of ethanol to remove alcohol-soluble material. After each alcohol extraction, the reaction mass was filtered. The final, alcohol-insoluble product was washed with water, filtered and dried. It had a melting point of 123° C.–124° C., weighed 79 g. and was the desired bis(1H,1H,11H-eicosafluoroundecyl) sulfate.

*Analysis.*—Calculated for $C_{22}H_6O_4SF_{40}$: C, 23.45; H, 0.53; S, 2.84; F, 67.50. Found: C, 23.4; H, 0.6; S, 2.9; F, 63.5.

EXAMPLE 5

*Bis(2,2,2-trifluoroethyl) sulfate*

To 280 g. (2.8 mol) of 2,2,2-trifluoroethanol, contained in a 500-ml., 4-necked flask fitted with reflux condenser and stirrer, was added slowly 24 g. (1 mol) of sodium hydride. During addition, the temperature rose to 70° C., while the charge became increasingly more viscous. To this mass was added at 70° C. a mixture of 67.5 g. (0.5 mol) of sulfuryl chloride and 70 g. (0.7 mol) of 2,2,2-trifluoroethanol. A white solid began to precipitate in the flask. After addition was complete, the mixture was refluxed for 20 hrs., cooled and filtered to remove the white precipitate. The filtrate was fractionally distilled. A cut, boiling at 150° C. to 154° C., was the desired bis(2,2,2-trifluoroethyl) sulfate, $n_D^{20}=1.3320$.

*Analysis.*—Calculated for $C_4H_4O_4SF_6$: C, 18.3; H, 1.53; F, 44.2. Found: C, 17.8; H, 1.8; F, 43.5.

EXAMPLE 6

*Alkylation reaction of 1H,1H,3H-tetrafluoropropyl chlorosulfonate with lithium chloride*

Lithium chloride (25.4 g., 0.6 mol) was heated in 75 ml. of diethylene glycol to 125° C. in a flask fitted with a water separator-condenser unit. 1H,1H,3H-tetrafluoropropyl chlorosulfonate (58 g., 0.25 mol) was added dropwise while stirring the reaction mixture. The product began to distill at the start of addition and continued to distill throughout the reaction. The pot temperature was raised to 170° C. before cooling. The crude distillate, collecting in the water separator, weighed 33 g. After being washed with ice water, drying over anhydrous $MgSO_4$ and distilling, pure 3-chloro-1,1,2,2-tetrafluoropropane, B.P. 50° C.–51° C., $n_D^{20}$ 1.3250, was obtained in 61% yield (23 g.).

EXAMPLE 7

*Alkylation reaction of bis(1H,1H,3H-tetrafluoropropyl) sulfate with lithium bromide*

Lithium bromide (14.5 g., 0.167 mol) and bis(1H,1H, 3H-tertrafluoropropyl) sulfate (27.5 g., 0.083 mol) were heated in 50 ml. diethylene glycol in a flask fitted with a water separator-condenser unit. The product began to distill when the mixture reached 125° C. and continued to come over as the reaction temperature rose. The pot temperature was raised to 165° C. before cooling. The crude distillate, collecting in the water separator, weighed 15.5 g. After being washed twice with ice water, drying over anhydrous $MgSO_4$ and distilling, pure 3-bromo-1,1,2,2-tetrafluoropropane, B.P. 76° C.–78° C., $n_D^{20}$ 1.3535, was obtained.

EXAMPLE 8

*Bis(1H,1H,3H-tetrafluoropropyl) sulfate reacted with aniline*

A 500 cc. stainless steel agitated pressure vessel was charged with 163 g. (0.5 mol) of bis(1H,1H,3H-tetrafluoropropyl) sulfate and 98 ml. (1.08 mol) of aniline, and heated for 13 hours at 230° C. The semi-solid reaction product was extracted with ether in a Soxhlet apparatus, and the ether extract solution was then washed with 5% hydrochloric acid solution to remove unreacted aniline and then with water. The ether solution was separated from the water layer and dried with anhydrous magnesium sulfate. After distilling off the ether, the residue was fractionally distilled under vacuum to yield 14 g. of a fraction having a slight yellow color, boiling at 126° C. at 30 mm., and having a refractive index $n_D^{27}=1.4742$. The product was identified by elemental analysis as N-1H,1H,3H-tetrafluoropropylaniline.

*Analysis.* — Calculated for $C_9H_9NF_4$: N=6.76%. Found: N=6.80%.

When coupled with diazotized p-aminophenacyltrimethyl - ammonium chloride, the N-1H,1H,3H-tetrafluoropropylaniline gives a product that dyes polyacrylic fiber and polyester fiber orange shades.

It will be understood that the preceding examples have been given for illustrative purposes solely and that this invention is not limited to the specific embodiments described therein. On the other hand, it will be readily apparent to those skilled in the art that, subject to the limitations set forth in the general description, many variations can be made in the materials, proportions, conditions, and techniques employed without departing from the spirit or scope of this invention.

From the preceding disclosure, it will be apparent that this invention provides novel classes of compounds and a novel process for producing them. The new compounds have valuable advantageous properties whereby they are useful for a wide variety of purposes. The process is simple and economical to carry out and can be readily controlled to produce selected products as the predominant or substantially sole product or mixtures of products, as desired. Also, the process and products of this invention provide new and improved routes for the production of other valuable products from polyfluoroalkanols. Accordingly, it is apparent that this invention constitutes a valuable advance in and contribution to the art.

The embodiments of the invention in which an exclusive property or privilege is claimed are defined as follows.

I claim:

1. A polyfluoroalkyl compound of the formula $$H(CF_2)_nCH_2O\text{---}SO_2\text{---}X$$

wherein X is a member of the group consisting of chlorine and a $\text{---}O\text{---}CH_2(CF_2)_nH$ group, and $n$ is an integer of from 2 to 10.

2. A polyfluoroalkyl chlorosulfonate of the formula $$H(CF_2)_nCH_2O\text{---}SO_2\text{---}Cl$$

wherein $n$ is an integer of from 2 to 4.

3. A bis(polyfluoroalkyl) sulfate of the formula $$H(CF_2)_nCH_2\text{---}O\text{---}SO_2\text{---}OCH_2(CF_2)_nH$$

wherein $n$ is an integer of from 2 to 10.

4. 1H,1H,3H-tetrafluoropropyl chlorosulfonate.
5. 1H,1H,5H-octafluoropentyl chlorosulfonate.
6. Bis(1H,1H,3H-tetrafluoropropyl) sulfate.
7. Bis(1H,1H,5H-octafluoropentyl) sulfate.
8. Bis(1H,1H,11H-eicosafluoroundecyl) sulfate.
9. A process for preparing a polyfluoroalkyl compound of the formula $$Y(CF_2)_nCH_2O\text{---}SO_2\text{---}X$$

wherein X is a member of the group consisting of chlorine and a $\text{---}O\text{---}CH_2(CF_2)_mY$ group, each Y is a member of the group consisting of hydrogen and fluorine, and each of $n$ and $m$ is an integer of from 1 to 12, which process comprises reacting from about 0.5 to about 1.25 mol of sulfuryl chloride with about 1 mol of an alkali metal alkoxide of the formula $$Y(CF_2)_nCH_2OM$$

wherein M is an alkali metal of an atomic weight of less than 40, Y is a member of the group consisting of hydrogen and fluorine and $n$ is an integer of from 1 to 12, in an inert organic solvent at a temperature of from about 25° C. to about 120° C.

10. A process for preparing a polyfluoroalkyl compound of the formula $$Y(CF_2)_nCH_2O\text{---}SO_2\text{---}X$$

wherein X is a member of the group consisting of chlorine and a $\text{---}O\text{---}CH_2(CF_2)_mY$ group, each Y is a member of the group consisting of hydrogen and fluorine, and each of $n$ and $m$ is an integer of from 1 to 12, which process comprises reacting from about 0.5 to about 1.25 mol of sulfuryl chloride with about 1 mol of an alkali metal alkoxide of the formula $$Y(CF_2)_nCH_2OM$$

wherein M is an alkali metal of an atomic weight of less than 40, Y is a member of the group consisting of hydrogen and fluorine and $n$ is an integer of from 1 to 12, in an inert organic solvent at a temperature of from about 40° C. to about 100° C.

11. A process for preparing a polyfluoroalkyl chlorosulfonate of the formula $$H(CF_2)_nCH_2O\text{---}SO_2\text{---}Cl$$

wherein $n$ is an integer of from 1 to 12, which process comprises reacting from about 1 to about 1.25 mol of sulfuryl chloride with about 1 mol of an alkali metal alkoxide of the formula $$H(CF_2)_nCH_2OM$$

wherein M is an alkali metal of an atomic weight of less than 40 and $n$ is an integer of from 1 to 12, in an inert organic solvent at a temperature of from about 25° C. to about 120° C.

12. A process for preparing a bis(polyfluoroalkyl) sulfate of the formula $$H(CF_2)_nCH_2O\text{---}SO_2\text{---}OCH_2(CF_2)_mH$$

wherein each of $n$ and $m$ is an integer of from 1 to 12, which process comprises reacting about 0.5 mol of sulfuryl chloride with about 1 mol of an alkali metal alkoxide of the formula $$H(CF_2)_nCH_2OM$$

wherein M is an alkali metal of an atomic weight of less than 40 and $n$ is an integer of from 1 to 12, in an inert organic solvent at a temperature of from about 25° C. to about 120° C.

13. A process for preparing a bis(polyfluoroalkyl) sulfate of the formula $$F(CF_2)_nCH_2O\text{---}SO_2\text{---}OCH_2(CF_2)_mF$$

wherein each of $n$ and $m$ is an integer of from 1 to 12, which process comprises reacting about 0.5 mol of sulfuryl chloride with about 1 mol of an alkali metal alkoxide of the formula $$F(CF_2)_nCH_2OM$$

wherein M is an alkali metal of an atomic weight of less than 40 and $n$ is an integer of from 1 to 12, in an inert organic solvent at a temperature of from about 25° C. to about 120° C.

References Cited in the file of this patent

UNITED STATES PATENTS

| | | |
|---|---|---|
| 2,559,751 | Berry et al. | July 10, 1951 |
| 2,732,398 | Brice et al. | Jan. 24, 1956 |

OTHER REFERENCES

Saunders et al.: J. Chem. Soc., 1949, pages 773–777.